US011268466B2

(12) United States Patent
Makled et al.

(10) Patent No.: US 11,268,466 B2
(45) Date of Patent: Mar. 8, 2022

(54) SYSTEMS AND METHODS FOR CONTROLLING DECELERATION FUEL SHUT OFF IN RESPONSE TO DETECTION OF AN EXTERNAL OBJECT OR LOCATION

(71) Applicant: Ford Global Technologies, LLC, Dearborn, MI (US)

(72) Inventors: Daniel A. Makled, Dearborn, MI (US); Michael McQuillen, Warren, MI (US); Matthew Affeldt, Sterling Heights, MI (US); Gopichandra Surnilla, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 213 days.

(21) Appl. No.: 16/586,782

(22) Filed: Sep. 27, 2019

(65) Prior Publication Data
US 2021/0095609 A1    Apr. 1, 2021

(51) Int. Cl.
| F02D 41/12 | (2006.01) |
| B60W 30/16 | (2020.01) |
| G08G 1/16 | (2006.01) |
| B60W 30/095 | (2012.01) |

(52) U.S. Cl.
CPC ......... F02D 41/123 (2013.01); B60W 30/095 (2013.01); B60W 30/16 (2013.01); G08G 1/161 (2013.01); B60W 2554/00 (2020.02)

(58) Field of Classification Search
CPC ... F02D 41/123; B60W 30/095; B60W 30/16; B60W 2554/00; G08G 1/161

USPC ........................................................ 123/325
See application file for complete search history.

(56) References Cited

U.S. PATENT DOCUMENTS

| 4,542,922 A | 9/1985 | Grossauer |
| 8,845,481 B2 | 9/2014 | Whitney et al. |
| 9,180,408 B2 | 11/2015 | Perry et al. |
| 9,938,908 B2 | 4/2018 | Li et al. |
| 9,983,591 B2 | 5/2018 | Micks et al. |
| 10,081,360 B2 | 9/2018 | Hu et al. |
| 10,322,725 B2 | 6/2019 | Cunningham et al. |
| 2014/0019030 A1* | 1/2014 | Schwindt ................ F02D 41/10 701/112 |
| 2017/0158194 A1* | 6/2017 | Leisenring ............. F01N 3/025 |
| 2018/0291824 A1* | 10/2018 | Richards ................ F02D 41/26 |
| 2020/0108818 A1* | 4/2020 | Adam ................ B60W 30/188 |

FOREIGN PATENT DOCUMENTS

EP          0086900 B1    3/1986

* cited by examiner

*Primary Examiner* — Mahmoud Gimie
(74) *Attorney, Agent, or Firm* — Geoffrey Brumbaugh; McCoy Russell LLP

(57) ABSTRACT

Systems and methods are provided for controlling deceleration fuel shut off (DFSO) in response to an external object or location, such as a target vehicle. In one example, a method may include, while operating an engine in DFSO, determining a rate of change of a range to the target vehicle, and commanding an exit from the DFSO based on the range rate of change. By exiting the DFSO based on the range rate of change, torque lash experienced by a driver may be correspondingly reduced as compared to exiting the DFSO based upon, for example, one or more powertrain operating conditions.

17 Claims, 7 Drawing Sheets

SYSTEMS AND METHODS FOR CONTROLLING DECELERATION FUEL SHUT OFF IN RESPONSE TO DETECTION OF AN EXTERNAL OBJECT OR LOCATION

FIELD

The present description relates generally to systems and methods for controlling deceleration fuel shut off in a vehicle in response to detection of an object or location external to the vehicle.

BACKGROUND/SUMMARY

Deceleration fuel shut off (DFSO) is a fuel-saving feature of some vehicles having internal combustion engines. Specifically, DFSO may improve fuel economy by deactivating one or more fuel injectors during vehicle deceleration. Typically, DFSO control is enabled based on various powertrain operating conditions, such as engine load or engine speed. Methods for controlling DFSO in this way may be implemented in a memory of a controller included in the vehicle. As such, during DFSO, the controller may be configured to respond to threshold adjustments in the engine load or the engine speed, for example, by exiting DFSO. Since such DFSO control methods are responsive to changes in one or more of the powertrain operating conditions having occurred, a corresponding delay may result, which may be experienced by the operator as torque lash. In some examples, DFSO may exit soon after initiating, and resulting torque lash may be misinterpreted by the operator as a bad transmission shift.

Other attempts to address torque lash include predicting pedal actuation, or lack thereof (e.g., coasting), and directly adjusting driveline torque based on the predicted pedal use. One example approach is shown by Cunningham et al. in U.S. Pat. No. 10,322,725. Therein, brake pedal actuation is predicted based on detected driver foot motion in a footwell region of a vehicle cab. Alternatively, a traffic sensor may be used to predict the brake pedal actuation (e.g., by indicating that a driver intends to brake, coast, etc., based on detected traffic). Driveline torque may then be actively adjusted in response to the predicted braking or coasting, resulting in a gentler torque transition and reduced torque lash.

However, the inventors herein have recognized potential issues with applying such methods and systems to DFSO control. As one example, adjusting driveline torque to reduce torque lash may still be subject to torque delay resulting from exiting DFSO immediately prior to, or simultaneously with, such torque adjustment. As another example, movement of the driver foot may provide little early warning for a DFSO control method in addition to that already provided by receipt of a torque request itself (e.g., upon the accelerator pedal soon after being depressed by the driver foot in motion). As such, predictions based on driver movement alone may be insufficient to resolve torque delay resulting from DFSO exit.

Accordingly, the inventors herein have provided systems and methods to at least partly address the above issues. One example includes a method including, while operating an engine in DFSO, determining a rate of change of a range to a target vehicle, and commanding an exit from the DFSO based on the range rate of change. In this way, the DFSO may be exited in advance of any direct input received by the driver (e.g., pedal actuation) or any indication from the driver of such direct input (e.g., driver movement). For example, by determining the rate of change of the range to the target vehicle, accelerator pedal actuation or brake pedal actuation may be predicted. Thus, the DFSO may be exited in anticipation of receiving a corresponding positive torque request or braking request (e.g., negative torque request), thereby reducing a likelihood and/or severity of torque lash as compared to exiting DFSO in a manner not based on distance to a target vehicle (such as in response to one or more DFSO exit conditions).

As a further example, the torque request may be predicted based on a change in speed limit provided by an altered speed zone detected ahead of the vehicle. Engine operating conditions may then be adjusted to mitigate torque lash based on the predicted torque request. For example, if the engine is currently operating in DFSO, an exit from the DFSO may then be advanced prior to when acceleration is next expected, and torque delay (and therefore torque lash) may be correspondingly reduced at a time of actual acceleration.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
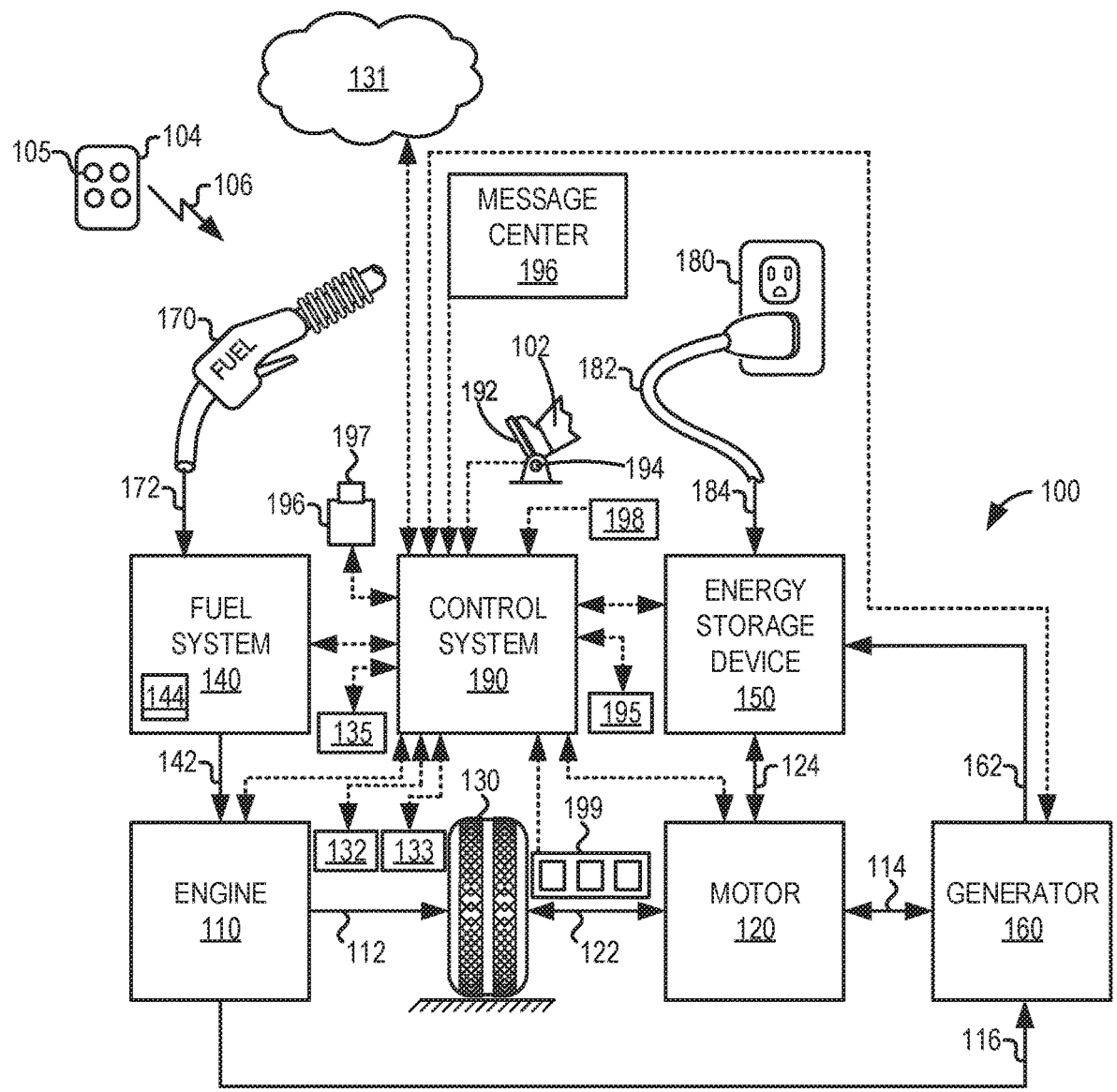
FIG. 1 shows a high-level block diagram illustrating an example vehicle system.
Figure 2:
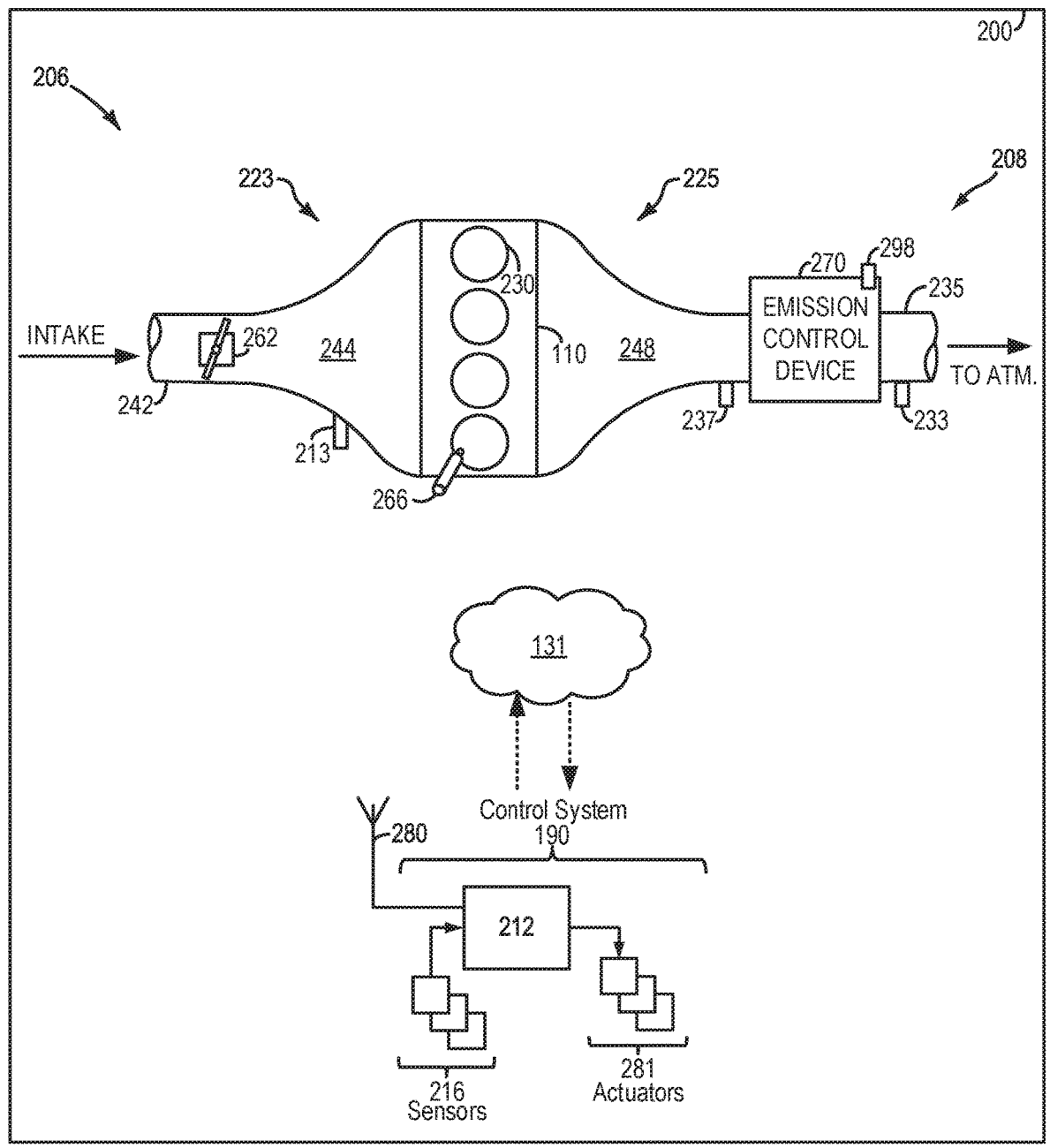
FIG. 2 shows a schematic diagram of at least a portion of the example vehicle system of FIG. 1.
Figure 4A:
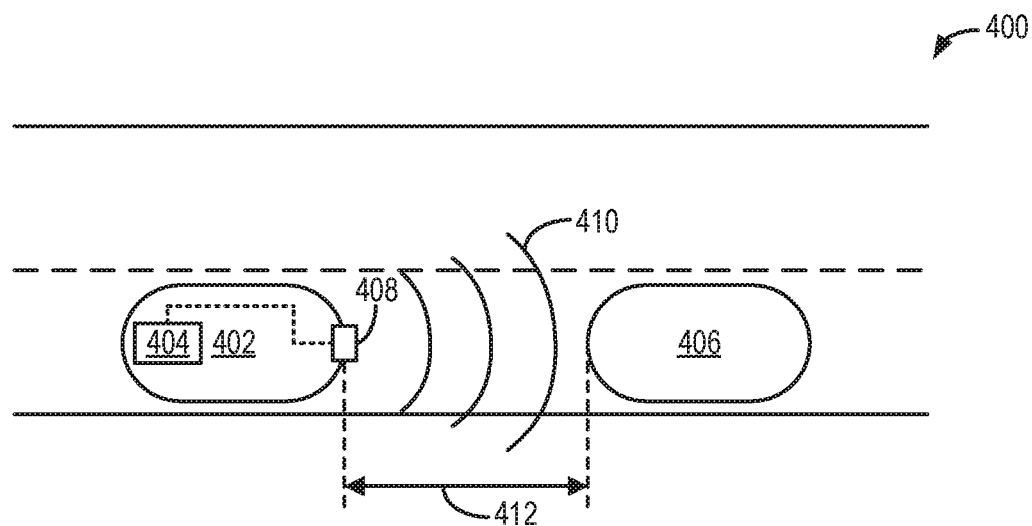
FIG. 4A shows a schematic diagram of an example process for detecting a target vehicle.
Figure 4B:
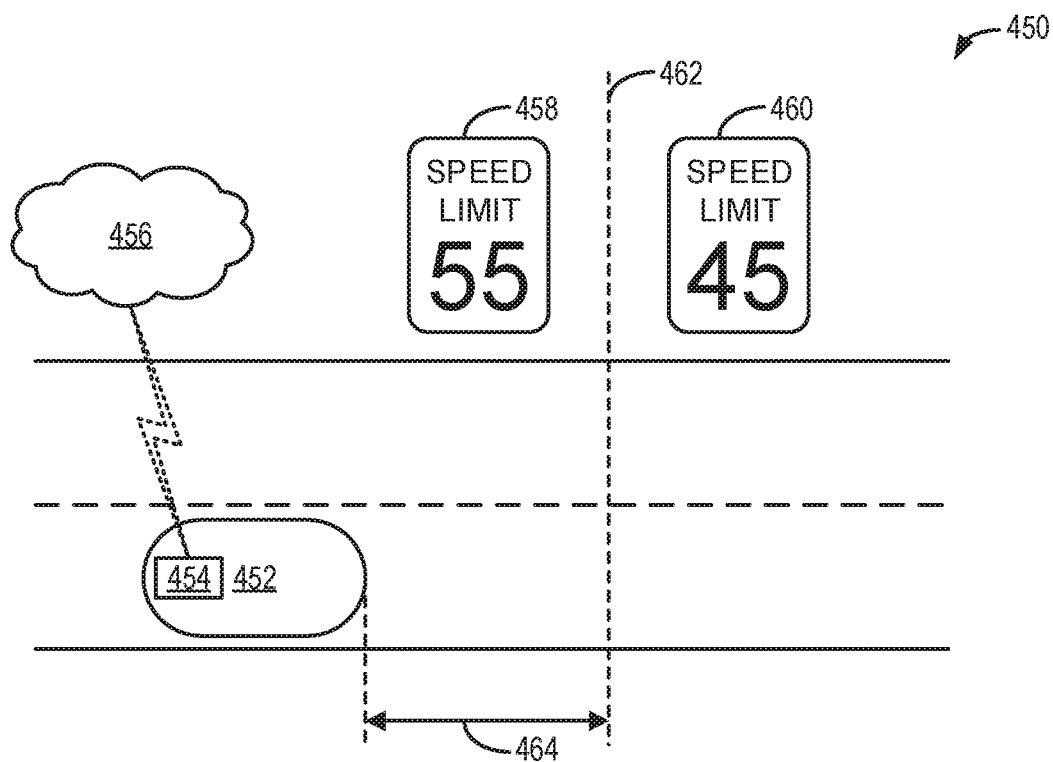
FIG. 4B shows a schematic diagram of an example process for detecting an altered speed zone.
Figure 5:
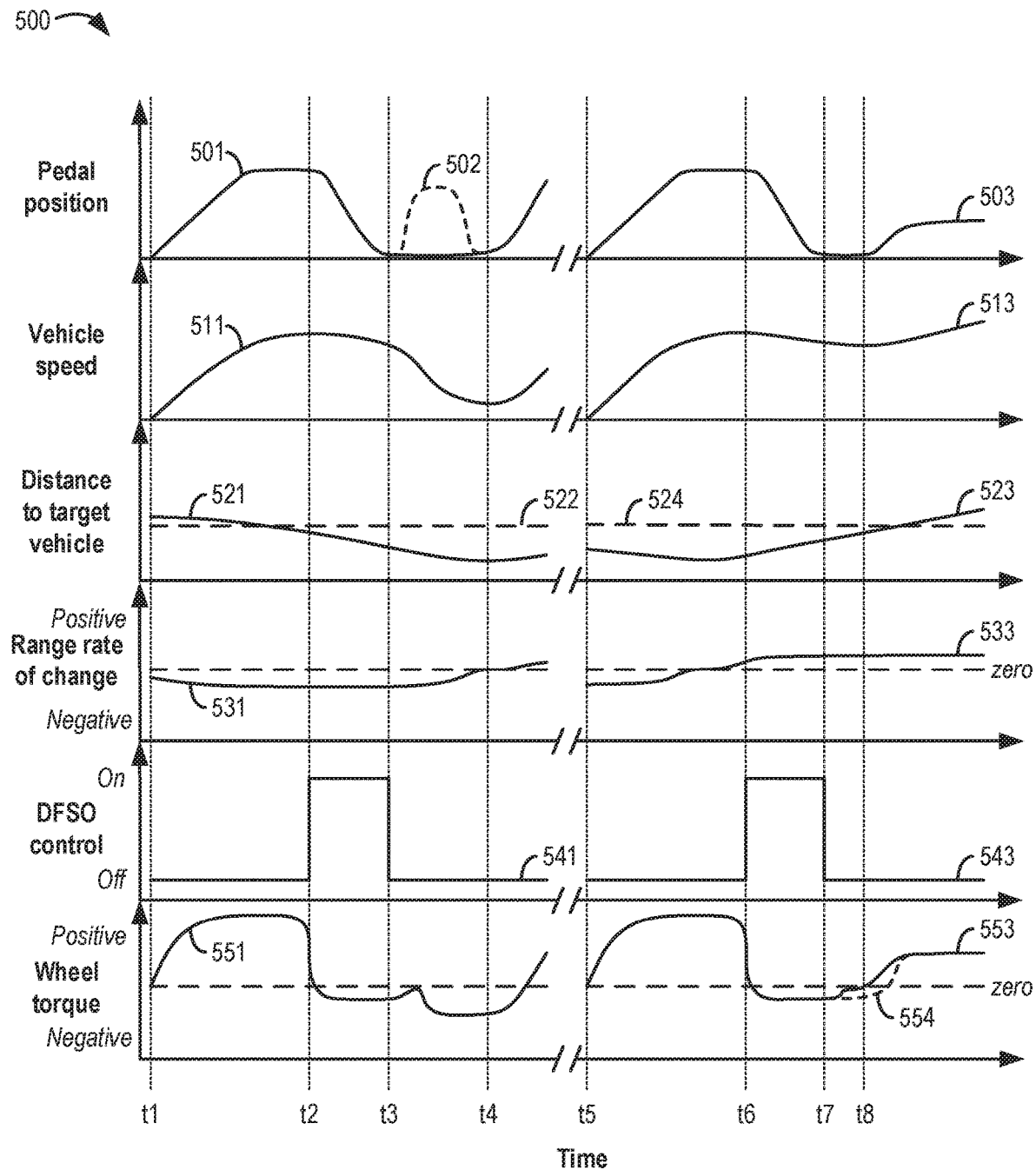
FIG. 5 shows prophetic examples of advancing exit from DFSO based on detection of the target vehicle.
Figure 6:
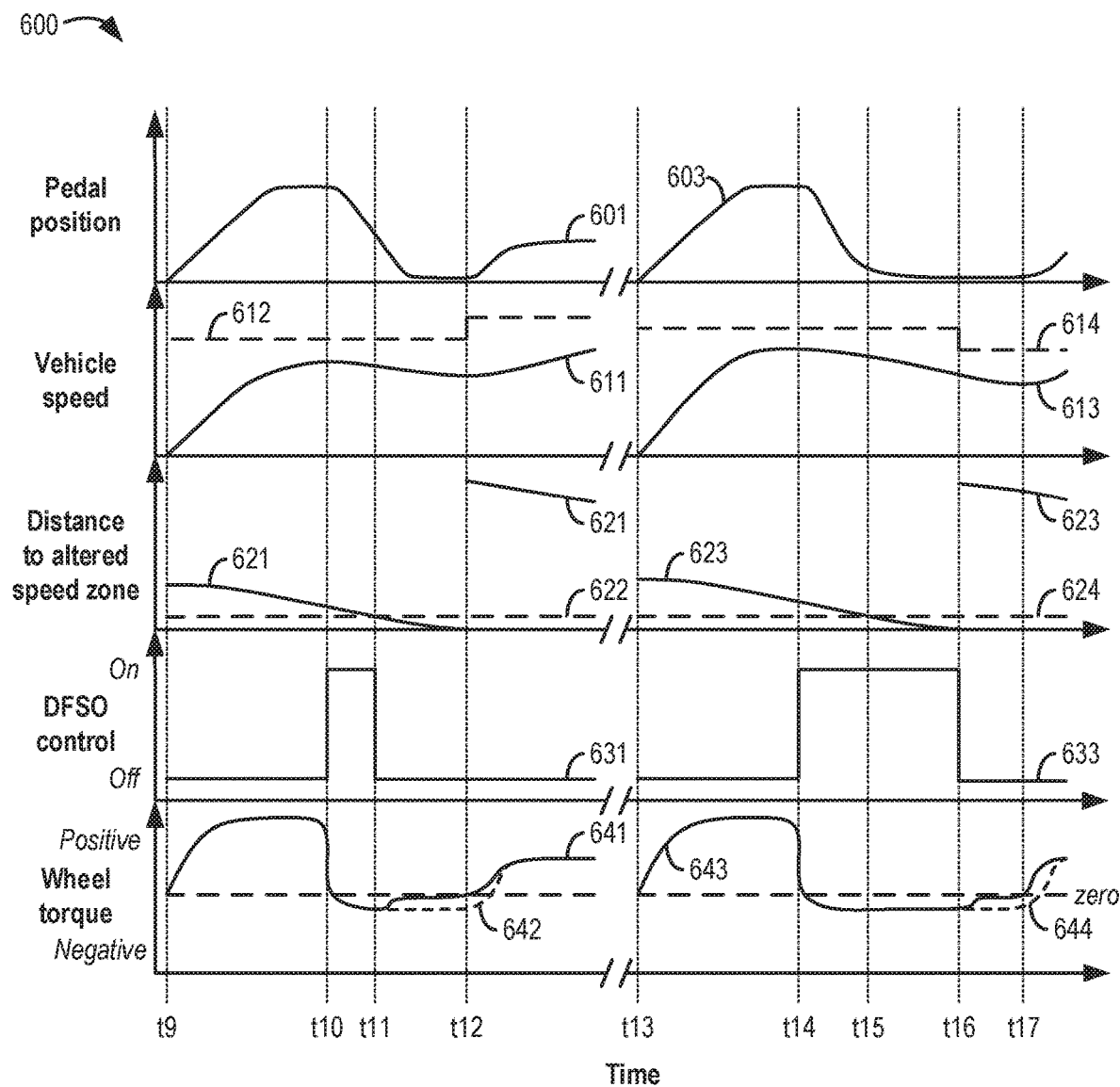
FIG. 6 shows prophetic examples of advancing exit from DFSO based on detection of the altered speed zone.

The following description relates to systems and methods for predicting a torque request in a vehicle based on an object or location external to the vehicle and controlling deceleration fuel shut off (DFSO) in an engine therefrom, such as in the engine included in the vehicle system of FIGS. 1 and 2. A control routine may be implemented at a controller further included in the vehicle system and configured to adjust one or more engine operating conditions to control DFSO. For example, the control routine may be the method depicted at FIGS. 3A and 3B for predicting the torque request and controlling DFSO therefrom. The torque request may be predicted based upon the detected object or location external to the vehicle. As examples, FIGS. 4A and 4B schematically depict detection of a target vehicle and an altered speed zone, respectively, on which processes for predicting the torque request may subsequently depend. Various prophetic examples for DFSO control (e.g., advancing exit from DFSO) in response to the predicted torque request are shown at FIGS. 5 and 6.

Referring now to FIG. 1, an example vehicle propulsion system 100 is depicted. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. In such an example, a vehicle with propulsion system 100 may be referred to as a hybrid electric vehicle (HEV).

Vehicle propulsion system 100 may utilize a variety of different operational modes depending on operating conditions encountered. Some of these modes may enable engine 110 to be maintained in an off state (e.g., set to a deactivated state) where combustion of fuel at the engine is discontinued. For example, under select operating conditions, motor 120 may propel the vehicle via one or more drive wheels 130 as indicated by arrow 122 while engine 110 is deactivated.

During other operating conditions, engine 110 may be set to a deactivated state (as described above) while motor 120 may be operated to charge an energy storage device 150. For example, motor 120 may receive wheel torque from drive wheel 130 as indicated by an arrow 122 where the motor may convert the kinetic energy of the vehicle to electrical energy for storage at energy storage device 150 as indicated by an arrow 124. This operation may be referred to as regenerative braking of the vehicle. Thus, motor 120 can provide a generator function in some examples. However, in other examples, a generator 160 may instead receive wheel torque from drive wheel 130, where generator 160 may convert the kinetic energy of the vehicle to electrical energy for storage at energy storage device 150 as indicated by an arrow 162.

During still other operating conditions, engine 110 may be operated by combusting fuel received from a fuel system 140 as indicated by an arrow 142. For example, engine 110 may be operated to propel the vehicle via drive wheel 130 as indicated by an arrow 112 while motor 120 is deactivated. During other operating conditions, both engine 110 and motor 120 may each be operated to propel the vehicle via drive wheel 130 as indicated by arrows 112 and 122, respectively. An example configuration where both engine 110 and motor 120 may selectively propel the vehicle may be referred to as a parallel type vehicle propulsion system. Note that in some examples, motor 120 may propel the vehicle via a first set of drive wheels and engine 110 may propel the vehicle via a second set of drive wheels.

In other examples, vehicle propulsion system 100 may be configured as a series type vehicle propulsion system, whereby engine 110 does not directly propel drive wheels 130. Rather, engine 110 may be operated to power motor 120, which may in turn propel the vehicle via drive wheel 130 as indicated by arrow 122. For example, during select operating conditions, engine 110 may drive generator 160 as indicated by an arrow 116, which may in turn supply electrical energy to one or more of motor 120 as indicated by an arrow 114 or energy storage device 150 as indicated by an arrow 162. As another example, engine 110 may be operated to drive motor 120 which may in turn provide a generator function to convert engine output to electrical energy, where the electrical energy may be stored at energy storage device 150 for later use by motor 120.

Fuel system 140 may include one or more fuel tanks 144 for storing fuel on-board the vehicle. For example, fuel tank 144 may store one or more liquid fuels, including but not limited to gasoline, diesel, and alcohol fuels. In some examples, the fuel may be stored onboard the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at engine 110 to produce the engine output. The engine output may be utilized to propel the vehicle (e.g., via drive wheels 130, as indicated by arrow 112) or to recharge energy storage device 150 via motor 120 or generator 160.

In some examples, energy storage device 150 may be configured to store electrical energy that may be supplied to other electrical loads residing on-board the vehicle (other than motor 120), including cabin heating and air conditioning, engine starting, headlights, cabin audio and video systems, etc. As a non-limiting example, energy storage device 150 may include one or more batteries and/or capacitors.

A control system 190 may communicate with one or more of engine 110, motor 120, fuel system 140, energy storage device 150, and generator 160. Control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of vehicle propulsion system 100 from a vehicle operator 102. For example, control system 190 may receive sensory feedback from a pedal position sensor 194 which communicates with a pedal 192. Pedal 192 may refer schematically to a brake pedal and/or an accelerator pedal. Furthermore, in some examples, control system 190 may be in communication with a remote engine start receiver 195 (or transceiver) that receives wireless signals 106 from a key fob 104 having a remote start button 105. In other examples (not shown), a remote engine start may be initiated via a cellular telephone, or smartphone based system where a user's cellular telephone sends data to a server and the server communicates with the vehicle to start engine 110.

Energy storage device 150 may periodically receive electrical energy from a power source 180 residing external to the vehicle (e.g., not part of the vehicle) as indicated by an arrow 184. As a non-limiting example, vehicle propulsion system 100 may be configured as a plug-in hybrid electric vehicle (PHEV), whereby electrical energy may be supplied to energy storage device 150 from power source 180 via an electrical energy transmission cable 182 (also referred to herein as electrical transmission cable 182). During a recharging operation of energy storage device 150 from power source 180, electrical transmission cable 182 may electrically couple energy storage device 150 and power source 180. While vehicle propulsion system 100 is operated to propel the vehicle, electrical transmission cable 182 may disconnected between power source 180 and energy storage device 150. Control system 190 may identify and/or control an amount of electrical energy stored at energy storage device 150, which may be referred to as a state of charge (SOC).

In other examples, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by an arrow 172. In some examples, fuel tank 144 may be configured to store the fuel received from fuel dispensing device 170 until it is supplied to engine 110 for combustion. In some examples, control system 190 may receive an indication of the level of fuel stored at fuel tank 144 via a fuel level sensor (not shown). The level of fuel stored at fuel tank 144 (e.g., as identified by the fuel level sensor) may be communicated to the vehicle operator, for example, via a fuel gauge or indication in a vehicle instrument panel 196.

Vehicle propulsion system 100 may also include an ambient temperature/humidity sensor 198, and a roll stability control sensor, such as a lateral and/or longitudinal and/or yaw rate sensor(s) 199. Vehicle instrument panel 196 may include indicator light(s) and/or a text-based display in which messages are displayed to an operator. Vehicle instrument panel 196 may also include various input portions for receiving an operator input, such as buttons, touch screens, voice input/recognition, etc. For example, vehicle instrument panel 196 may include a refueling button 197 which may be manually actuated or pressed by vehicle operator 102 to initiate refueling. For example, in response to vehicle operator 102 actuating refueling button 197, a fuel tank (e.g., 144) in the vehicle may be depressurized so that refueling may be performed.

In some examples, vehicle propulsion system 100 may include one or more onboard cameras 135. Onboard cameras 135 may communicate photos and/or video images to control system 190, for example. Onboard cameras may in some examples be utilized to record images within a predetermined radius of the vehicle, for example. As such, control system 190 may employ signals (e.g., images) received by onboard cameras 135 to detect and identify object(s) and location(s) external to the vehicle.

Control system 190 may be communicatively coupled to other vehicles or infrastructures using appropriate communications technology, as is known in the art. For example, control system 190 may be coupled to other vehicles or infrastructures via a wireless network 131, which may comprise Wi-Fi, Bluetooth, a type of cellular service, a wireless data transfer protocol, and so on. Control system 190 may broadcast (and receive) information regarding vehicle data, vehicle diagnostics, traffic conditions, vehicle location information, vehicle operating procedures, etc., via vehicle-to-vehicle (V2V), vehicle-to-infrastructure-to-vehicle (V2I2V), and/or vehicle-to-infrastructure (V2I or V2X) technology. The communication and the information exchanged between vehicles may be either direct between vehicles, or multi-hop. In some examples, longer range communications (e.g., WiMax) may be used in place of, or in conjunction with, V2V, or V2I2V, to extend coverage area on an order of a few miles. In still other examples, control system 190 may be communicatively coupled to other vehicles or infrastructures via wireless network 131 and the Internet (e.g., cloud), as is commonly known in the art. In further examples, wireless network 131 may be a plurality of wireless networks 131 across which data may be communicated to vehicle propulsion system 100.

Vehicle propulsion system 100 may also include an onboard navigation system 132 (for example, a global positioning system, or GPS) with which vehicle operator 102 may interact. Onboard navigation system 132 may include one or more location sensors for assisting in estimating vehicle speed, vehicle altitude, vehicle position/location, etc. Such information may be used to infer engine operating parameters, such as local barometric pressure. As discussed above, control system 190 may further be configured to receive information via the Internet or other communication networks. Information received from the onboard navigation system 132 may be cross-referenced to information available via the Internet to determine local weather conditions, local vehicle regulations, etc. In some examples, vehicle propulsion system 100 may include laser sensors (e.g., lidar sensors), radar sensors, sonar sensors, and/or acoustic sensors 133, which may enable vehicle location, traffic information, etc., to be collected via the vehicle.

Referring now to FIG. 2, a vehicle system 206 of a vehicle 200 is schematically depicted. It may be understood that vehicle system 206 may be the same as vehicle propulsion system 100 depicted at FIG. 1. In some examples, vehicle system 206 may be a hybrid electric vehicle system. However, it may be understood that the description herein may refer to a non-hybrid vehicle, for example a vehicle equipped with an engine and not an motor that can operate to at least partially propel the vehicle, without departing from the scope of the present disclosure.

Vehicle system 206 includes an engine system 208, where engine system 208 may include engine 110 having a plurality of cylinders 230. Fuel may be delivered by one or more fuel injectors 266 to cylinders 230 during a single cycle of cylinders 230. Further, a distribution and/or relative amount of fuel delivered, and injection timing may vary with operating conditions, such as a DFSO entry condition, a DFSO exit condition, engine load, engine knock, exhaust temperature, etc. For example, engine system 208 may be configured to operate in DFSO by ceasing fuel injection from one or more fuel injectors 266 responsive to one or more DFSO entry conditions (e.g., engine load below an engine load threshold, engine speed below an engine speed threshold, etc.).

The engine system 208 may include engine 110 having a plurality of cylinders 230. Engine 110 includes an engine air intake system 223 and an engine exhaust system 225. Engine air intake system 223 includes a throttle 262 in fluidic communication with an engine intake manifold 244 via an intake passage 242. Further, engine air intake system 223 may include an air box and filter (not shown) positioned upstream of throttle 262. Engine exhaust system 225 includes an exhaust manifold 248 leading to an exhaust passage 235 that routes exhaust gas to the atmosphere. The engine exhaust system 225 may include an emission control device 270, which may be mounted in a close-coupled position in exhaust passage 235 (e.g., closer to engine 110 than an outlet of exhaust passage 235) and may include one or more exhaust catalysts. In some examples, an electric heater 298 may be coupled to emission control device 270, and utilized to heat emission control device 270 to or beyond a predetermined temperature (e.g., light-off temperature). Emission control device 270 may include a three-way catalyst, lean nitrogen oxide ($NO_x$) trap, diesel particulate filter, oxidation catalyst, etc. It will be appreciated that other components may be included in engine system 208 such as a variety of valves and sensors. For example, a barometric pressure sensor 213 may be included in engine air intake system 223. In one example, barometric pressure sensor 213 may be a manifold air pressure (MAP) sensor and may be coupled to engine intake manifold 244 downstream of throttle 262. Barometric pressure sensor 213 may rely on part throttle or full or wide open throttle conditions, e.g., when an opening amount of throttle 262 is greater than a threshold, in order accurately determine a barometric pressure.

Control system 190 is shown receiving information from a plurality of sensors 216 (various examples of which are described herein) and sending control signals to a plurality of actuators 281 (various examples of which are described herein). As one example, sensors 216 may include an exhaust gas sensor 237 located upstream of emission control device 270 in exhaust passage 235 and a temperature sensor 233 located downstream of emission control device 270 in exhaust passage 235. Other sensors such as pressure, temperature, air/fuel ratio, and composition sensors may be coupled to various locations in the vehicle system 206. As another example, actuators 281 may include throttle 262 and fuel injector 266. Controller 212 may further include wireless communication device 280, to enable wireless communication between vehicle 200 and other vehicles or infrastructures, via wireless network 131.

Controller 212 may receive input data from the various sensors 216, process the input data, and trigger the various actuators 281 in response to the processed input data based on instruction or code programmed therein corresponding to one or more routines. Example control routines are described herein with regard to FIGS. 3A and 3B. For example, controller 212 may determine whether one or more DFSO entry conditions are met based on various vehicle and engine operating conditions. For example, controller 212 may enter DFSO responsive to a drop in operator torque demand. In response to one or more DFSO entry conditions being met, controller 212 may operate engine 110 without fuel injection (e.g., by disabling fuel injector 266) and with cylinder valves continuing to pump air through cylinders 230. As a result of DFSO, engine 110 may decelerate along with vehicle 200.

During DFSO, responsive to an operator torque demand for increased torque (also referred to herein as a torque request), controller 212 may determine that DFSO exit conditions have been met. Alternatively, during DFSO, responsive to an engine speed falling below a threshold speed (and above a zero speed), controller 212 may determine that DFSO exit conditions have been met. In either example, controller 212 may resume cylinder fueling by reactivating one or more fuel injectors (e.g., fuel injector 266).

In some examples, there may be a delay between exit from DFSO and torque delivery resulting from reactivation of fuel injection. As such, an operator may experience torque lash as torque increases from the slight negative torque present during DFSO transitions through zero torque to fulfill the operator torque demand. Such a transition may result in a driveline backlash, potentially increasing issues related to noise, vibration, and harshness (NVH). To compensate for such torque lash, a more gentle transition of the torque in response to the operator torque demand is desired. Thus, controller 212 may implement a DFSO control routine, such as that described below with references to FIGS. 3A and 3B, which may predict torque requests prior to receiving them, and may therefore exit DFSO prior to receiving a given torque request. In this way, torque delay may be reduced upon the torque request, as DFSO may have already exited, and thus experienced torque lash may be reduced or avoided.

Figure 3A:
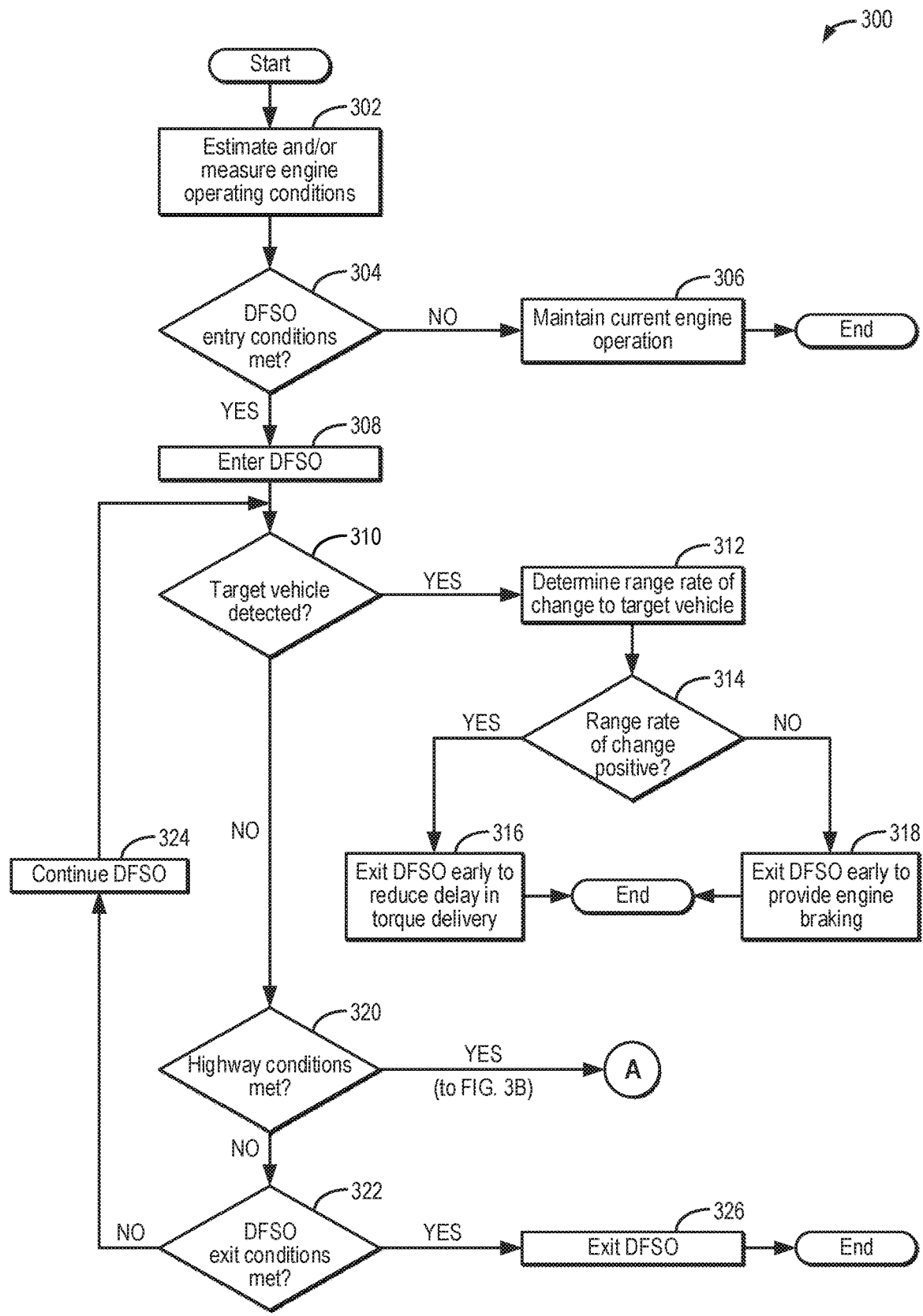
FIGS. 3A and 3B show a flow chart of a method for predicting a torque request and controlling deceleration fuel shut off (DFSO) therefrom.
Figure 3B:
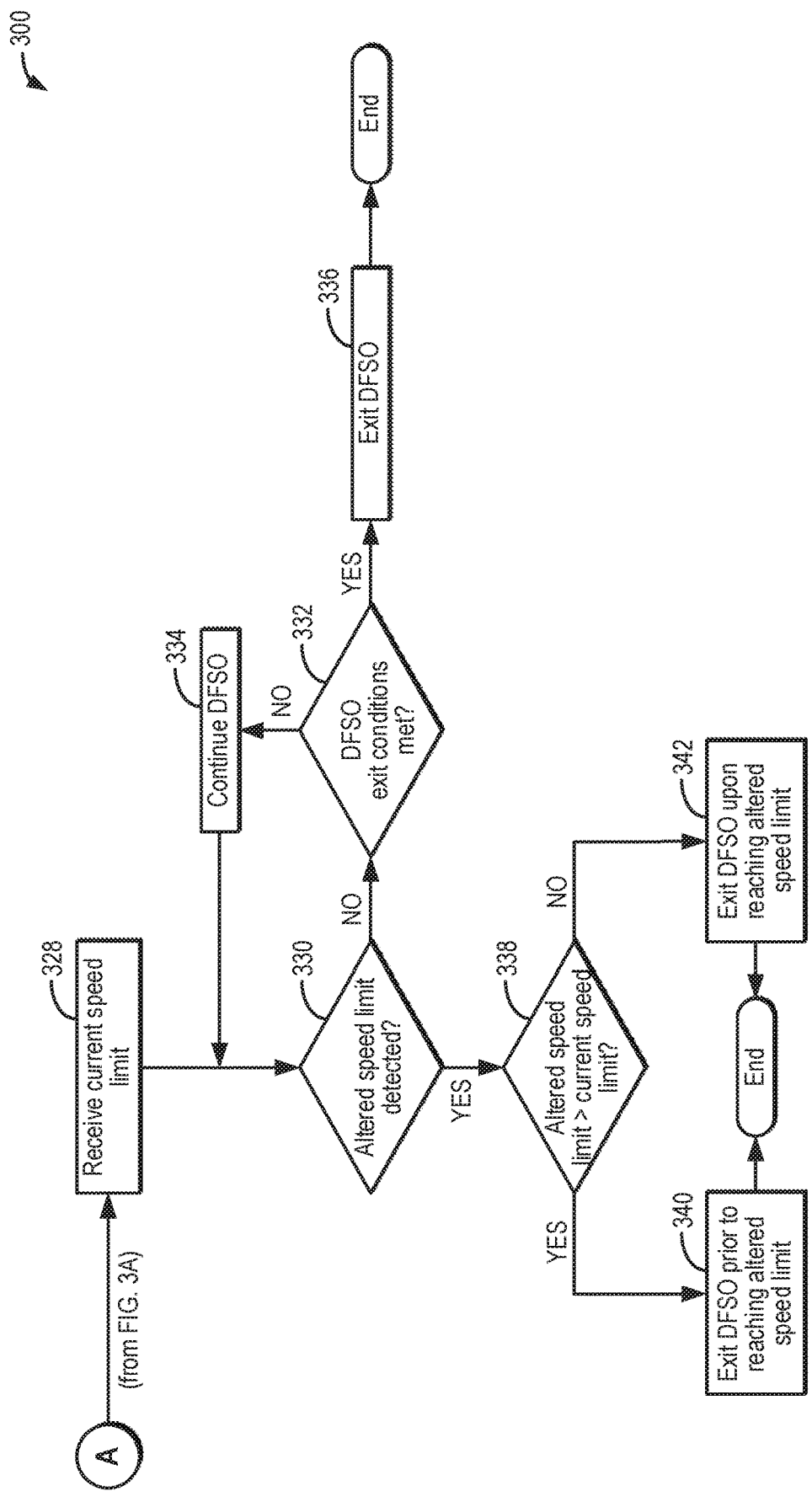

Referring now to FIGS. 3A and 3B, a flow chart of an example routine 300 for controlling DFSO in a vehicle system is depicted. The vehicle system may be the vehicle system of FIGS. 1 and 2, for example. Further, components described with reference to routine 300 may be embodiments of corresponding components of the vehicle system of FIGS. 1 and 2. Instructions for carrying out routine 300 and further methods referenced herein may be executed by a processor of a controller, such as controller 212 described above with reference to FIG. 1, based on instructions stored on a memory of the controller and in conjunction with signals received from onboard systems, devices, and sensors of the vehicle system, such as the sensors described above with reference to FIGS. 1 and 2. For example, onboard navigation system 132, onboard cameras 135, and sensors 133, 198, 199, 213, 233, 237, and 298 may supply feedback to controller 212 via control system 190. Further, the controller may employ engine actuators included in the vehicle system to adjust engine operation in the physical world, according to the methods described below. As such, routine 300 may deactivate or reactivate a fuel injector, such as fuel injector 266 of FIG. 2, upon one or more DFSO entry conditions or one or more DFSO exit conditions being met, respectively. Routine 300 may further be operative to exit DFSO and reactivate the fuel injector prior to meeting the one or more DFSO exit conditions responsive to predicting receipt of a torque request based on detection of an object or location external to the vehicle. In this way, torque delay may be reduced and a corresponding torque lash may be mitigated, which may thereby improve operator satisfaction by reducing NVH issues.

Beginning at FIG. 3A, at 302, routine 300 may include estimating and/or measuring one or more engine operating conditions, including engine speed, engine load, engine temperature, ambient conditions (e.g., ambient temperature, pressure, and humidity), current operator torque demand, manifold pressure, manifold air flow, fuel temperature, exhaust gas temperature, exhaust gas air-fuel ratio, exhaust catalyst conditions, etc. The one or more engine operating conditions may be measured by one or more sensors communicatively coupled to the controller (e.g., the exhaust gas temperature may be measured directly via temperature sensor 233) or may be inferred based on available data (e.g., the engine temperature may be estimated from an engine coolant temperature measured by an engine coolant temperature sensor).

Routine 300 may use the one or more engine operating conditions to infer a current state of engine operation, and determine therefrom whether to alter the state of engine operation. For example, at 304, routine 300 may include determining whether one or more DFSO entry conditions have been met based on the estimated and/or measured engine operating condition(s), and/or other vehicle operating conditions. For example, a combination of one or more of vehicle speed, vehicle acceleration, engine speed, engine load, throttle position, accelerator pedal position, transmission gear position, and various other parameters may be employed to determine whether the DFSO entry conditions have been met. In one example, the DFSO entry conditions may be confirmed based on engine speed being below a first engine speed threshold. In another example, the DFSO entry conditions may be confirmed based on engine load or operator torque demand being below a threshold. In yet another example, the DFSO entry conditions may be confirmed based on a lower than threshold displacement of an accelerator pedal position (e.g., operator release of the accelerator pedal, such as during coasting), such as upon initiation of a tip-out event.

If the one or more DFSO entry conditions have not been met, for example, if the tip-out event is not initiated, routine 300 may progress to 306 to maintain current engine operation. For example, fuel injection may continue and the engine may not enter DFSO. Routine 300 may then end.

If the one or more DFSO entry conditions have been met, for example, if the tip-out event is initiated, routine 300 may progress to 308 to enter DFSO. During DFSO, the vehicle may receive a torque request (e.g., an operator torque demand from the operator actuating the accelerator pedal). However, there may be a delay between receiving the torque request and an actual torque delivery due to a timeframe in which fuel injectors are reactivated to exit DFSO. Such torque delay may result in a more pronounced driveline lash (also referred herein as torque lash) upon torque reversal from a negative torque to a positive torque, which may increase issues related to NVH.

The inventors have herein recognized that, by predicting an upcoming receipt of a positive torque request while the vehicle is operating in DFSO, the DFSO condition may be exited prior to one or more DFSO exit conditions (e.g., based on engine and vehicle operating conditions) being met, thus mitigating torque lash by minimizing torque delay responsive to the positive torque request actually being received. As such, when the operator actuates the accelerator pedal, the engine may not be in DFSO, and the engine may already be generating positive torque. Thus, the driveline lash caused by torque reversal may be minimized. In the art, numerous communication and sensor systems exist for gathering data on an external environment of the vehicle, such as navigation, mapping, traffic condition, and collision avoidance systems. Such data may be utilized by the controller to predict and/or learn when the operator may provide a torque request based on the external environment. To provide just one example from those discussed below, the operator may accelerate upon reaching a speed zone with a higher speed limit. Thus, upon receiving a notification indicative of an upcoming speed zone with a higher speed limit, the controller may command an exit from DFSO prior to (e.g., within a threshold distance of) reaching the speed zone. Alternatively, if the received notification indicates the upcoming speed zone has a lower speed limit, the controller may command the exit from DFSO at a later time (e.g., upon reaching the upcoming speed zone), as the operator may not accelerate again until after reaching the upcoming speed zone. In this way, DFSO may be effectively utilized to provide fuel economy benefits without detracting from operator experience.

As a further example, a range rate of change to a target vehicle located ahead of a host vehicle (e.g., a vehicle implementing routine 300 at a controller included therein) may be determined and employed as a means of predicting receipt of a torque request (e.g., a positive torque request) or a braking request (e.g., a negative torque request). Thus, at 310, routine 300 may include determining whether a target vehicle is detected within a first distance threshold of a front of the host vehicle. One or more forward-facing sensors may be disposed on or within a front face (e.g., a hood) of the host vehicle. The one or more forward-facing sensors may be configured for a variety of activities. For example, the one or more forward-facing sensors may be operable to determine ambient conditions (e.g., temperature, barometric pressure, wind resistance) of an external environment surrounding the front face of the host vehicle. Additionally or alternatively, the one or more forward-facing sensors may be configured to detect, image, and/or identify objects and locations in the external environment. Thus, the one or more forward-facing sensors may receive an indication of a target location being within the first distance threshold of the host vehicle, which may then be processed at the controller to identify the target location. The one or more forward-facing sensors may include any sensor known in the art for these purposes, such as laser sensors (e.g., lidar sensors), radar sensors, sonar sensors, acoustic sensors, onboard cameras, or combinations thereof. In further examples, the indication of the target location being within the first distance threshold of the host vehicle may be received over one or more networks with which the host vehicle is in communication (e.g., a smart traffic system, V2V, V2I2V, and the like). In examples wherein the one or more networks include a V2V or V2I2V network, the indication may include information (e.g., speed, acceleration, location) relating to another nearby vehicle.

As an example, the one or more forward-facing sensors may receive signals and/or images indicative of a target vehicle located ahead of the host vehicle. The controller may receive the signals and/or images from the one or more forward-facing sensors and may then detect and identify the target vehicle by processing the received signals. In some examples, the controller may implement an object detection algorithm which separates visual characteristics from content of an image to detect and identify an object in a received image. In some examples, light-detecting sensors (e.g., lidar sensors) may receive signals indicative of a brake light status of the target vehicle. The controller may further be operable to estimate a distance to the target vehicle based on the received signals. The controller may periodically update the distance to the target vehicle and temporarily store prior distance estimations and times at which the prior distance estimations were made in non-transitory memory (e.g., until the target vehicle has moved outside of the first distance threshold). In some examples, the periodic updating of the distance to the target vehicle may occur over a predetermined duration prior to routine 300 moving on from 310.

If the target vehicle is detected within the first distance threshold, for example, if an indication of the target vehicle has been received and processed such that the target vehicle is positively identified, routine 300 may progress to 312 to determine a range rate of change to the target vehicle (that is, a rate of change of a distance from the host vehicle to the target vehicle). In one example, the range rate of change (v) may be based on a derivative of the estimated distance (l) to the target vehicle with respect to time (t) as $$v = \frac{dl}{dt}$$

In another example, a plurality of stored distance estimations to the target vehicle and times at which the distance estimations were made may be fit to a function, and the range rate of change may be determined based on the function. In some examples, the function may be a linear function, and the range rate of change may be determined as a slope of the linear function. In other examples, the function may be a polynomial function, and the range rate of change may be determined as a derivative of the polynomial function at a given point.

A sign (e.g., positive or negative) of the range rate of change may be employed to predict an adjustment of one or more of an engine load and an engine speed in response to a received torque request or braking request. As such, at 314, routine 300 may include determining whether the range rate of change is positive. If the range rate of change is determined to be positive, that is, if the distance between the target vehicle and the host vehicle is increasing, routine 300 may progress to 316 to exit DFSO early (e.g., prior to one or more DFSO exit conditions based on engine and/or vehicle operating conditions being met) to reduce delay in torque delivery from a predicted torque request. The range rate of change may be determined to be positive after a threshold duration passes during which the range rate of change remains positive, for example.

In some examples, an upcoming receipt of the torque request may be predicted responsive to the range rate of change being determined to be positive. As such, an increase in one or more of the engine load and the engine speed (e.g., from the predicted torque request) may be predicted. As an example, the operator of the host vehicle may respond to an increasing distance between the host vehicle and the target vehicle by actuating an accelerator pedal and providing the torque request. In anticipation of such an event (that is, prior to receipt of an actual torque request), an exit from DFSO may be advanced so as to reduce any torque delay resulting from reactivation of fuel injection which otherwise would occur simultaneously with receipt of the actual torque request. Said another way, the controller may command an exit from DFSO prior to the predicted increase in the one or more of the engine load and the engine speed resulting from the torque request. In this way, the operator may experience less torque lash, potentially reducing issues related to NVH. Routine 300 may then end.

If the range rate of change is determined to be negative, that is, if the distance between the target vehicle and the host vehicle is decreasing, routine 300 may progress to 318 to exit DFSO early (e.g., prior to one or more DFSO exit conditions being met) to provide engine braking for a predicted braking request. The range rate of change may be determined to be negative after a threshold duration passes during which the range rate of change remains negative, for example.

In some examples, an upcoming receipt of the braking request may be predicted responsive to the range rate of change being determined to be negative. As such, a decrease in one or more of the engine load and the engine speed (e.g., from the predicted braking request) may be predicted. As an example, the operator of the host vehicle may respond to a decreasing distance between the host vehicle and the target vehicle by actuating a brake pedal and providing the braking request. In anticipation of such an event (that is, prior to receipt of an actual braking request), an exit from DFSO may be advanced, reactivating fuel injection so as to provide engine braking which otherwise would occur simultaneous with receipt of the actual braking request. Said another way, the controller may command an exit from DFSO prior to the predicted decrease in the one or more of the engine load and the engine speed resulting from the braking request.

Specifically, because the exit from DFSO is being advanced, the controller may be provided with additional time to adjust engine operating conditions prior to the engine speed decelerating to a predetermined lowest allowable engine speed. The predetermined lowest allowable engine speed may be set based on an engine speed threshold at which active engine restart is commanded to prevent the engine from stalling. The additional time resulting from the advanced exit from DFSO may allow the engine speed to accelerate more slowly, which may result in reduced wear on the engine. For example, one or more cylinders of the engine may be reactivated in a way which optimizes smoothness of engine speed acceleration (rather than minimizing a duration over which such engine speed acceleration occurs, which may cause increase NVH issues). Routine 300 may then end.

It will be appreciated that numerous variants of a portion of routine 300 corresponding to 302 to 318 fall within the scope of this disclosure. As one example, the range rate of change may be determined to be positive or negative in response to a magnitude of the range rate of change being determined to be higher than a magnitude threshold. In such an example, if the magnitude of the range rate of change is determined to be lower than the magnitude threshold, DFSO may continue uninterrupted until either the magnitude threshold is met or one or more DFSO exit conditions are met. As another example, the target vehicle may be detected prior to initiating DFSO. As such, the controller may prevent the engine from operating in DFSO if, for example, the magnitude of the range rate of change is determined to be higher than the magnitude threshold (indicating, for example, that the controller would otherwise exit DFSO soon after entering DFSO). As yet another example, the magnitude threshold may be adaptively set in that the controller may learn from prior behavior of the operator, that is, when the operator ends up providing the torque request or the braking request in actuality. For instance, the operator may be prone to aggressive driving behavior, such that the braking request may be expected when the distance to the target vehicle is particularly narrow or that the torque request may be expected soon after acceleration of the target vehicle. Alternatively, the operator may be prone to cautious driving behavior, such that the braking request may be expected when the distance to the target vehicle is particularly wide or that the torque request may be expected long after acceleration of the target vehicle.

Returning to 310, if the target vehicle is not detected within the first distance threshold, for example, if an indication of the target vehicle has not been received, routine 300 may progress to 320 to determine whether one or more highway conditions have been met. For example, a combination of one or more of an ambient temperature, a vehicle speed, a wind resistance, a barometric pressure, and various other parameters may be employed to determine whether highway conditions have been met. In one example, the highway conditions may be confirmed based on the vehicle speed being above a vehicle speed threshold. In another example, the highway conditions may be confirmed based on the ambient temperature being above an ambient temperature threshold (where the ambient temperature threshold may be adjusted with respect to a forecasted ambient temperature, for example). In yet another example, the highway conditions may be confirmed based on the wind resistance being above a wind resistance threshold (where the wind resistance threshold may be adjusted with respect to a forecasted wind speed, for example). In further examples, the highway conditions may be confirmed based on an indication received at the onboard navigation system.

If the one or more highway conditions have not been met, routine 300 may progress to 322 to determine whether one or more DFSO exit conditions have been met based on estimated and/or measured engine operating condition(s), and/or other vehicle operating conditions. For example, a combination of one or more of vehicle speed, vehicle acceleration, engine speed, engine load, throttle position, accelerator pedal position, transmission gear position, and various other parameters may be employed to determine whether the DFSO exit conditions have been met. In one example, the DFSO exit conditions may be confirmed based on engine speed being below a second engine speed threshold, where the second engine speed threshold is lower than the first engine speed threshold (e.g., DFSO may exit to reactivate fuel injection and prevent stalling of the engine when the engine speed falls below the second engine speed threshold). In another example, the DFSO exit conditions may be confirmed based on engine load or operator torque demand being above a threshold. In yet another example, the DFSO exit conditions may be confirmed based on a higher than threshold displacement of the accelerator pedal position (e.g., operator actuation of the accelerator pedal, such as upon acceleration) or based on a higher than threshold displacement of a brake pedal position (e.g., operator actuation of the brake pedal, such as upon braking).

If the DFSO exit conditions are not met, routine 300 may progress to 324 to continue DFSO (e.g., maintain engine DFSO operation). Routine 300 may then return to 310. If the DFSO exit conditions are met, routine 300 may progress to 326 to exit DFSO. Routine 300 may then end.

Returning to 320, if the one or more highway conditions have been met, the controller may determine that the vehicle is operating in a driving environment with more predictable behavior. For example, the one or more highway conditions being met may indicate that the vehicle is operating in a highway driving environment, which may correspond to more predictable behavior by the operator than in a neighborhood or downtown driving environment. Specifically, vehicle speed changes may be predicted as a function of upcoming speed limit changes, for example.

As such, and continuing now to FIG. 3B, routine 300 may progress to 328 to receive a current speed limit. The current speed limit may correspond to a speed limit of a current speed zone within which the vehicle is operating. An indication of the current speed limit may be received at the controller over one or more networks with which the vehicle is in communication (e.g., a smart traffic system, V2V, V2I2V, and the like), or via prior mapping of the external environment in which the vehicle operates (e.g., via the onboard navigation system). In additional or alternative examples, an indication of the current speed limit may be received at the controller via advanced driver-assistance systems, such as environmental sensing (e.g., via the one or more forward-facing sensors described hereinabove) for adaptive or autonomous cruise control. For example, the indication of the current speed limit may be based upon information (e.g., speed, acceleration, location) received over a V2V or V2I2V network relating to one or more nearby vehicles. In additional or alternative examples, the current speed limit may be estimated by the controller based on measured and/or estimated speeds of one or more detected nearby vehicles.

At 330, routine 300 may include determining whether an altered speed limit is detected within a second distance threshold of the front of the vehicle. The altered speed limit may correspond to a speed limit of an altered speed zone located ahead of the vehicle. As such, the altered speed zone may be considered by the controller as a target location located ahead of the vehicle on which to base predictions of an acceleration event or a deceleration event of the vehicle. Exemplary systems of receiving the altered speed limit are analogous to those described above at 328 for receiving the current speed limit.

In some examples, the second distance threshold employed to detect the altered speed limit may be higher than the first distance threshold employed to detect the target vehicle, as the altered speed limit may be indicated by signals received via one or more networks and the target vehicle may be indicated by signals received via one or more forward-facing sensors. In other examples, the first distance threshold may be equal to or higher than the second distance threshold, as each of the altered speed limit and the target vehicle may be indicated by signals received via one or more networks.

If the altered speed limit is not detected, for example, if no indication of the altered speed limit is received by the controller, routine 300 may progress to 332 to determine whether or not one or more DFSO exit conditions have been met based on estimated and/or measured engine operating condition(s), and/or other vehicle operating conditions. For example, a combination of one or more of vehicle speed, vehicle acceleration, engine speed, engine load, throttle position pedal position, transmission gear position, and various other parameters may be employed to determine whether the DFSO exit conditions have been met. Examples of the DFSO exit conditions being confirmed are described hereinabove at 322.

If the DFSO exit conditions are not met, routine 300 may progress to 334 to continue DFSO (e.g., maintain engine DFSO operation). Routine 300 may then return to 330. If the DFSO exit conditions are met, routine 300 may progress to 336 to exit DFSO. Routine 300 may then end.

Returning to 330, if the altered speed limit is detected, for example, if the indication of the altered speed limit is received by the controller, routine 300 may progress to 338 to determine whether the altered speed limit is greater than the current speed limit. If the altered speed limit is greater than the current speed limit, that is, if the altered speed zone has a higher speed limit than the current speed zone, routine 300 may progress to 340 to exit DFSO prior to reaching the altered speed limit.

In examples wherein the altered speed zone has a higher speed limit than the current speed zone, the controller may predict the vehicle accelerating upon reaching the altered speed zone. As such, an increase in one or more of the engine load and the engine speed (e.g., from a corresponding torque request) may be predicted. As an example, the operator of the vehicle may respond to approaching the higher speed limit by actuating the accelerator pedal and providing the torque request upon reaching the altered speed zone. In anticipation of such an event (that is, prior to receipt of an actual torque request), an exit from DFSO may be advanced so as to reduce any torque delay resulting from reactivation of fuel injection. Said another way, the controller may command an exit from DFSO prior to the predicted increase in the one or more of the engine load and the engine speed resulting from the torque request (that is, prior to reaching the altered speed zone). In this way, the operator may experience less torque lash, potentially reducing issues related to NVH. Routine 300 may then end.

If the altered speed limit is less than the current speed limit, that is, if the altered speed zone has a lower speed limit than the current speed zone, routine 300 may progress to 342 to exit DFSO upon reaching the altered speed limit.

In examples wherein the altered speed zone has a lower speed limit than the current speed zone, the controller may predict the vehicle decelerating and entering the altered speed zone, and then accelerating at a time after entering the altered speed zone to maintain a lowered vehicle speed. As such, an increase in one or more of the engine load and the engine speed (e.g., from a corresponding torque request) may be predicted upon such acceleration. As an example, the operator of the vehicle may respond to approaching the lower speed limit by first actuating the brake pedal and providing a braking request upon reaching the altered speed zone, and then, after entering the altered speed zone and lowering the vehicle speed to below the altered speed limit, actuating the accelerator pedal and providing the torque request to maintain the vehicle speed. In anticipation of such an event (that is, prior to the predicted receipt of the torque request), an exit from DFSO may be advanced so as to reduce any torque delay resulting from reactivation of fuel injection. Said another way, the controller may command an exit from DFSO prior to the predicted increase in the one or more of the engine load and the engine speed resulting from the torque request (that is, upon reaching the altered speed zone). In this way, the operator may experience less torque lash, potentially reducing operator discomfort and confusion, as well as mistakes made as a result of the discomfort and confusion.

In additional or alternative examples wherein the altered speed zone has a lower speed limit than the current speed limit, an exit from DFSO may be delayed by the controller. For example, the controller may typically end DFSO after a predetermined duration (e.g., 20 s). However, if the altered speed zone having the lower speed limit is detected, then DFSO may be extended to opportunistically take advantage of the vehicle coasting to meet the lower speed limit. In this way, DFSO duration may be altered based on detection of a lower speed limit ahead of the vehicle, thereby improving engine efficiency and reducing undesired exhaust emissions. Routine 300 may then end.

It will be appreciated that numerous variants of a portion of routine 300 corresponding to 328 to 342 fall within the scope of this disclosure. In one example, wherein the altered speed limit is higher than the current speed limit and the altered speed limit is received prior to initiating DFSO, the controller may prevent the engine from operating in DFSO if, for example, the controller predicts the acceleration event occurring upon reaching the altered speed limit (indicating, for example, that the controller would otherwise exit DFSO soon after entering DFSO). In another example, wherein the altered speed limit is lower than the current speed limit, the controller may continue uninterrupted until one or more DFSO exit conditions are met. As yet another example, the second distance threshold and/or a time at which DFSO is commanded to exit may vary based on a function of a magnitude of the current speed limit, a magnitude of the altered speed limit, and a difference between the current speed limit and the altered speed limit. For instance, the second distance threshold may be longer or the DFSO may be commanded to exit earlier when the current speed limit or the altered speed limit is relatively high (e.g., 55 miles per hour or greater) as compared to when the current speed limit is relatively low (e.g., less than 55 miles per hour), as the vehicle may take a reduced amount of time to travel a given distance at correspondingly higher vehicle speeds. As yet another example, the second distance threshold and/or the time at which DFSO is commanded to exit may be adaptively set in that the controller may learn from prior behavior of the operator, that is, when the operator ends up providing the torque request in actuality. For instance, the operator may be prone to aggressive driving behavior, such that the torque request may be expected as soon as allowable (e.g., upon reaching an altered speed zone with a higher speed limit). Alternatively, the operator may be prone to cautious driving behavior, such that the torque request may be expected following a delay during which the operator may assess when acceleration is prudent (e.g., after reaching an altered speed zone with a higher speed limit).

In this way, a control routine may be executed which controls a DFSO operating mode of an engine based on detection of a target location (e.g., a target vehicle, an altered speed zone) external to a vehicle. Specifically, the control routine may advance an exit from DFSO, or prevent the engine from entering DFSO entirely, based on the detected target location. It will be appreciated that further target locations may be employed without departing from the scope of this disclosure. As an example, the vehicle may receive signals indicative of traffic signal indicators ahead of the vehicle (e.g., via light-detecting sensors or a smart traffic system). As another example, the vehicle may receive signals indicative of traffic signs notifying an operator of the vehicle of a further traffic sign (e.g., a stop sign) or a traffic signal ahead of the vehicle (e.g., via object detection or a smart traffic system).

Referring now to FIG. 4A, a schematic diagram 400 of an example process for detecting a target vehicle 406 within a threshold distance 412 (e.g., the first distance threshold of the routine described above with reference to FIGS. 3A and 3B) of a host vehicle 402 is depicted. It may be understood that a DFSO control routine, such as the routine described above with reference to FIGS. 3A and 3B, may be implemented on a control system 404 of host vehicle 402, such as the control system described above with reference to FIGS. 1 and 2. It may further be understood that control system 404 may be included in a vehicle system, such as the vehicle system described above with reference to FIGS. 1 and 2. As shown, at least one forward-facing sensor 408 may be disposed on or within a front face (e.g., a hood) of host vehicle 402. By way of example, forward-facing sensor 408 may be a laser sensor (e.g., lidar sensor), radar sensor, sonar sensor, or acoustic sensor. As shown, forward-facing sensor 408 may be communicably couple to control system 404. In schematic diagram 400, forward-facing sensor 408 is depicted as emitting and receiving signals 410. Signals 410 may then be transmitted to and processed by control system 404. In other examples not depicted at FIG. 4A, forward-facing sensor 408 may be an onboard camera, whereby images may be received by forward-facing sensor 408, and then transmitted to and processed by control system 404. In this way, the control system of the host vehicle may anticipate an operator torque demand (e.g., a positive or negative torque request provided by operator actuation of an accelerator pedal or a brake pedal therein) in response to detecting the target vehicle and alter one or more engine operating parameters to mitigate issues related to NVH. For example, responsive to a predicted positive torque request, the control system may exit DFSO early to reduce both torque delay and experienced torque lash therefrom, as discussed hereinabove.

Referring now to FIG. 4B, a schematic diagram 450 of an example process for detecting an altered speed zone 460 within a threshold distance 464 (e.g., the second distance threshold of the routine described above with reference to FIGS. 3A and 3B) of a vehicle 452 is depicted. It may be understood that a DFSO control routine, such as the routine described above with reference to FIGS. 3A and 3B, may be implemented on a control system 454 of vehicle 452, such as the control system described above with reference to FIGS. 1 and 2. It may further be understood that control system 454 may be included in a vehicle system, such as the vehicle system described above with reference to FIGS. 1 and 2. As shown, control system 454 may be communicably coupled to a network 456 (e.g., a smart traffic system, V2V, V2I2V, or the like), from which an indication of altered speed zone 460 may be received. In other examples not depicted but within the scope of this disclosure, the indication of altered speed zone 460 may be received by control system 454 via prior mapping of the external environment in which the vehicle operates (e.g., via an onboard navigation system), advanced driver-assistance systems (such as environmental sensing via one or more sensors for adaptive or autonomous cruise control), or the indication of altered speed zone 460 may be based on measured and/or estimated speeds of one or more detected nearby vehicles. The indication of altered speed zone 460 may include an estimated or virtually exact (e.g., based on municipal, state, or federal records or statutes) boundary 462 between a current speed zone 458 and altered speed zone 460. In the example depicted, a speed limit of altered speed zone 460 is lower than a speed limit of current speed zone 458. However, it will be appreciated that in other examples the speed limit of altered speed zone 460 may be higher than the speed limit of current speed zone 458. In this way, the control system of the vehicle may anticipate an operator torque demand (e.g., a positive or negative torque request provided by operator actuation of an accelerator pedal or a brake pedal therein) in response to detecting the altered speed zone and alter one or more engine operating conditions to mitigate issues related to NVH. For example, responsive to a predicted positive torque request, the control system may exit DFSO early to reduce both torque delay and experienced torque lash therefrom, as discussed hereinabove.

Referring now to FIG. 5, a timeline 500 depicting two example operations of advancing exit from DFSO based on detection of a target vehicle within a threshold distance (e.g., the first distance threshold of the routine described above with reference to FIGS. 3A and 3B) of a host vehicle is shown. First, engine operating conditions are altered to exit DFSO in response to a range rate of change between the host vehicle and the target vehicle being negative, and then, at a later time, the engine operating conditions are altered to exit DFSO in response to the range rate of change being positive. The two example operations may utilize a DFSO control routine for controlling an exit from DFSO based on detection of a target location, such as the routine described above with reference to FIGS. 3A and 3B.

Timeline 500 depicts an accelerator pedal position at solid curves 501 and 503, a brake pedal position at dashed curve 502, a vehicle speed at solid curves 511 and 513, a distance to the target vehicle at solid curves 521 and 523, the range rate of change between the host vehicle and the target vehicle at solid curves 531 and 533, a DFSO control routine status at solid curves 541 and 543, and a wheel torque at solid curves 551 and 553. Additionally, dashed curves 522 and 524 represent the threshold distance between the host vehicle and the target vehicle and dashed curve 554 represents a hypothetical wheel torque in response to not exiting DFSO at t7 (as described in detail below). All curves are depicted over time (plotted along an abscissa, where time increases from left to right of the abscissa). Further, a dependent variable represented by each curve discussed above is plotted along a respective ordinate, where the dependent variable increases from bottom to top of the given ordinate (unless otherwise stated or shown). Unless otherwise stated, it will be understood that all engine operating conditions and variables on timeline 500 representing such engine operating conditions are that of the host vehicle and not the target vehicle.

Prior to t1, the host vehicle is not in operation and the engine is shut down (e.g., having a speed of zero, without combustion occurring). At t1, responsive to an operator request, the engine is started.

Between t1 and t2, engine operation is ongoing. The accelerator pedal position (curve 501) is depressed via an operator foot, thereby actuating the accelerator pedal and providing an operator torque demand. Correspondingly, the vehicle speed increases (curve 511), accelerating in response to the accelerator pedal actuation. As the vehicle speed increases, the distance to the target vehicle correspondingly decreases (curve 521) as the vehicle travels toward the target vehicle. Correspondingly, the range rate of change is negative (curve 531). Further, the wheel torque is shown is increasing in a positive direction (curve 551) in response to the accelerator pedal actuation. Before t2, the distance to the target vehicle falls below the threshold distance (curve 522), indicating that the target vehicle is close enough to the host vehicle to be detected.

At t2, the vehicle speed peaks and begins decreasing (curve 511) in response to the accelerator pedal position returning to a default position (curve 501). As a result, the wheel torque transitions from a positive value to a slightly negative value (curve 551). Further, in response to the vehicle decelerating, the engine enters DFSO (e.g., fuel injection to the cylinders is shut off) and the DFSO control routine activates (curve 541).

Between t2 and t3, the DFSO control routine remains on (curve 541), and the controller collects data on the distance to the target vehicle (curve 521) and uses that data to determine the range rate of change (curve 531) over a duration (e.g., from t2 to t3). Once a sign (e.g., negative) of the range rate of change between t2 and t3 is determined, the DFSO control routine predicts that a braking request (e.g., a negative torque request) will be received and exits DFSO early in anticipation of engine braking.

Thus, at t3, the DFSO control routine ends (curve 541) and fuel injection is resumed during vehicle deceleration, resulting in a slight adjustment of the wheel torque towards a positive value (curve 551). Then, between t3 and t4, the operator actuates the brake pedal (curve 502), applying engine braking. As a result, the vehicle speed decreases faster (curve 511), the wheel torque becomes more negative (curve 551), and the distance to the target vehicle decreases more slowly (curve 521) until the range rate of change reaches zero at around t4.

Further, at t4, the accelerator pedal is actuated (curve 501), resulting in an increase in vehicle speed (curve 511) and a transition of the wheel torque from a negative value to a positive value (curve 551) as vehicle deceleration ends. As such, absent the DFSO control routine provided by the present disclosure, t4 may be considered the time at which DFSO might otherwise exit.

In this example, the target vehicle pulls away from the host vehicle after t4, thus increasing the distance between the host vehicle and target vehicle (curve 521) such that the range rate of change becomes positive (curve 531). The host vehicle then continues typical vehicle operation. Between t4 and t5, an extended time interval is indicated by a break in the abscissa during which the host vehicle may be used consistently. During this period, the engine shuts down.

Immediately prior to t5, the host vehicle is not in operation and the engine is shut down. At t5, responsive to an operator request, the engine is started.

Between t5 and t6, engine operation is ongoing. The accelerator pedal position (curve 503) is depressed via an operator foot, thereby actuating the accelerator pedal and providing an operator torque demand. Correspondingly, the vehicle speed increases (curve 513), accelerating in response to the accelerator pedal actuation. As the vehicle speed increases, the distance to the target vehicle correspondingly decreases (curve 523) as the vehicle travels toward the target vehicle. Correspondingly, the range rate of change is negative (curve 533). Further, the wheel torque is shown is increasing in a positive direction (curve 553) in response to the accelerator pedal actuation.

During this time, the distance to the target vehicle remains below the threshold distance (curve 524), indicating that the target vehicle is close enough to the host vehicle to be detected. However, in this example, the target vehicle accelerates and begins to travel faster than the host vehicle. As such, the distance between the target vehicle and the host vehicle begins increasing (curve 523) and the range rate of change transitions from a negative value to a positive value (curve 533).

At t6, the vehicle speed peaks and begins decreasing (curve 513) in response to the accelerator pedal returning to the default position (curve 503). As a result, the wheel torque transitions from a positive value to a slightly negative value (curve 553). Further, in response to the vehicle decelerating, the engine enters DFSO (e.g., fuel injection to the cylinders is shut off) and the DFSO control routine activates (curve 543).

Between t6 and t7, the DFSO control routine remains on (curve 543), and the controller collects data on the distance to the target vehicle (curve 523) and uses that data to determine the range rate of change (curve 533) over a duration (e.g., from t6 to t7). Once a sign (e.g., positive) of the range rate of change between t6 and t7 is determined, the DFSO control routine predicts that a positive torque request will be received and exits DFSO early in anticipation of torque delivery.

Thus, at t7, the DFSO control routine ends (curve 543) and fuel injection is resumed during vehicle deceleration, resulting in a slight adjustment of the wheel torque towards a positive value (curve 553). Between t7 and t8, the host vehicle continues to decelerate. When, at t8, the accelerator pedal is actuated (curve 503), the vehicle speed increases (curve 513) and a resulting torque transition is reduced as a result of exiting DFSO prior to vehicle acceleration. Absent the DFSO control routine provided by the present disclosure, significant torque lash due to a larger transition through zero torque (as shown by curve 554) resulting from torque delay when the DFSO might otherwise exit (e.g., at t8) may be experienced by the operator. That is, the DFSO control routine provides a gentler transition through zero torque by exiting DFSO early, thus mitigating torque lash and issues related to NVH.

In this example, after t8, the target vehicle pulls away from the host vehicle, thus increasing the distance between the host vehicle and target vehicle (curve 523) beyond the threshold distance (curve 524) such that the range rate of change remains positive (curve 533). The host vehicle then continues typical vehicle operation until the engine is shut down.

Referring now to FIG. 6, a timeline 600 depicting two example operations of advancing exit from DFSO based on detection of an altered speed zone within a threshold distance (e.g., the second distance threshold of the routine described above with reference to FIGS. 3A and 3B) of a vehicle is shown. First, engine operating conditions are altered to exit DFSO in response to a speed limit of a first altered speed zone being higher than a speed limit of a current speed zone, and then, at a later time, the engine operating conditions are altered to exit DFSO in response to a speed limit of a second altered speed zone being lower than the speed limit of the current speed zone. The two example operations may utilize a DFSO control routine for controlling an exit from DFSO based on detection of a target location, such as the routine described above with reference to FIGS. 3A and 3B.

Timeline 600 depicts an accelerator pedal position at solid curves 601 and 603, a vehicle speed at solid curves 611 and 613, a distance to the altered speed zone at solid curves 621 and 623, a DFSO control routine status at solid curves 631 and 633, and a wheel torque at solid curves 641 and 643. Additionally, dashed curves 612 and 614 represent the speed limit in a speed zone in which the vehicle is currently operating, dashed curves 622 and 624 represent the threshold distance between the vehicle and the altered speed zone, and dashed curve 642 and 644 represent hypothetical wheel torques in response to not exiting DFSO at t11 and t16, respectively (as described in detail below). All curves are depicted over time (plotted along an abscissa, where time increases from left to right of the abscissa). Further, a dependent variable represented by each curve discussed above is plotted along a respective ordinate, where the dependent variable increases from bottom to top of the given ordinate (unless otherwise stated or shown).

Prior to t9, the vehicle is not in operation and the engine is shut down (e.g., having a speed of zero, without combustion occurring). At t9, responsive to an operator request, the engine is started.

Between t9 and t10, engine operation is ongoing. The accelerator pedal position (curve 601) is depressed via an operator foot, thereby actuating the accelerator pedal and providing an operator torque demand. Correspondingly, the vehicle speed increases (curve 611), accelerating in response to the accelerator pedal actuation. As the vehicle speed increases, distance to the altered speed zone correspondingly decreases (curve 621) as the vehicle travels toward the altered speed zone. Further, the wheel torque is shown is increasing in a positive direction (curve 641) in response to the accelerator pedal actuation.

At t10, the vehicle speed peaks and begins decreasing (curve 611) in response to the accelerator pedal position returning to a default position (curve 601). As a result, the wheel torque transitions from a positive value to a slightly negative value (curve 641). Further, in response to the vehicle decelerating, the engine enters DFSO (e.g., fuel injection to the cylinders is shut off) and the DFSO control routine activates (curve 631).

Between t10 and t11, the DFSO control routine remains on (curve 631). As the vehicle speed decreases (curve 611), so does the distance to the altered speed zone (curve 621) until, at t11, the distance to the altered speed zone reaches the threshold distance (curve 622). The controller receives an indication of the altered speed zone being within the threshold distance of the vehicle, along with an indication that the speed limit (curve 612) will increase in the altered speed zone relative to the current speed zone. In response, at t11, the DFSO control routine ends, exiting DFSO and resuming fuel injection during vehicle deceleration and prior to the vehicle reaching the altered speed zone, thereby anticipating acceleration upon reaching the altered speed zone in response to the increased speed limit. As a result of DFSO exit, the wheel torque slightly adjusts towards a positive value (curve 641).

Between t11 and t12, the vehicle continues to decelerate. At t12, the vehicle reaches the altered speed zone having the increased speed limit (e.g., curve 612), such that the distance to the altered speed zone is zero at t12 and then increases to a positive value immediately thereafter (that is, after t12, curve 621 shows the distance to a further speed zone following the altered speed zone). When the accelerator pedal is actuated (curve 601) in response to the increased speed limit, the vehicle speed increases (curve 611) and a resulting torque transition is reduced (curve 641) as a result of exiting DFSO prior to vehicle acceleration. Absent the DFSO control routine provided by the present disclosure, significant torque lash due to a larger transition through zero torque (as shown by curve 642) resulting from torque delay when the DFSO might otherwise exit (e.g., at t12) may be experienced by the operator. That is, the DFSO control routine provides a gentler transition through zero torque by exiting DFSO early, thus mitigating torque lash and issues related to NVH.

After t12, the vehicle then continues typical vehicle operation. Between t12 and t13, an extended time interval is indicated by a break in the abscissa during which the vehicle may be used consistently. During this period, the engine shuts down.

Immediately prior to t13, the vehicle is not in operation and the engine is shut down. At t13, responsive to an operator request, the engine is started.

Between t13 and t14, engine operation is ongoing. The accelerator pedal position (curve 603) is depressed via an operator foot, thereby actuating the accelerator pedal and providing an operator torque demand. Correspondingly, the vehicle speed increases (curve 613), accelerating in response to the accelerator pedal actuation. As the vehicle speed increases, distance to the altered speed zone correspondingly decreases (curve 623) as the vehicle travels toward the altered speed zone. Further, the wheel torque is shown is increasing in a positive direction (curve 643) in response to the accelerator pedal actuation.

At t14, the vehicle speed peaks and begins decreasing (curve 613) in response to the accelerator pedal position returning to the default position (curve 603). As a result, the wheel torque transitions from a positive value to a slightly negative value (curve 643). Further, in response to the vehicle decelerating, the engine enters DFSO (e.g., fuel injection to the cylinders is shut off) and the DFSO control routine activates (curve 633).

Between t14 and t15, the DFSO control routine remains on (curve 633). As the vehicle speed decreases (curve 613), so does the distance to the altered speed zone (curve 623) until, at t15, the distance to the altered speed zone reaches the threshold distance (curve 624). The controller receives an indication of the altered speed zone being within the threshold distance of the vehicle, along with an indication that the speed limit (curve 614) will decrease in the altered speed zone relative to the current speed zone. In response, at t15, the DFSO control routine remains on, as vehicle acceleration is not predicted until after the vehicle decelerates to meet the decreased speed limit of the altered speed zone.

Between t15 and t16, the vehicle continues to decelerate. At t16, the vehicle reaches the altered speed zone having the decreased speed limit (e.g., curve 614), such that the distance to the altered speed zone is zero at t16 and then increases to a positive value immediately thereafter (that is, after t16, curve 623 shows the distance to a further speed zone following the altered speed zone). In response, at t16, the DFSO control routine ends (curve 633), exiting DFSO and resuming fuel injection during vehicle deceleration and upon the vehicle reaching the altered speed zone, thereby anticipating acceleration at a time following vehicle deceleration in response to the decreased speed limit. As a result of DFSO exit, the wheel torque slightly adjusts towards a positive value (curve 643).

Between t16 and t17, the vehicle continues to decelerate. When, at t17, the accelerator pedal is actuated (curve 603), the vehicle speed increases (curve 613) and a resulting torque transition is reduced (curve 643) as a result of exiting DFSO prior to vehicle acceleration. Absent the DFSO control routine provided by the present disclosure, significant torque lash due to a larger transition through zero torque (as shown by curve 644) resulting from torque delay when the DFSO might otherwise exit (e.g., at t17) may be experienced by the operator. That is, the DFSO control routine provides a gentler transition through zero torque by exiting DFSO early, thus mitigating torque lash and issues related to NVH.

After t17, the host vehicle then continues typical vehicle operation until the engine is shut down.

In this way, DFSO may be controlled based on prediction of a torque request. The predicted torque request may in turn be based upon detection of an external object or location (e.g., another vehicle or an altered speed zone), and an exit from the DFSO may be correspondingly adjusted in response to the detection. For example, the adjusted exit from the DFSO may be earlier than if the DFSO was controlled based upon one or more powertrain operating conditions or a detected driver movement. Thus, the DFSO may be controlled prior to receiving any actual driver input. A technical effect of controlling the DFSO absent actual driver input is that torque lash may be reduced as a result of a delay between exiting the DFSO and providing torque to the engine. Similarly, the DFSO may be exited early to re-engage fuel injection upon engine braking without delay.

An example of a method comprises, while operating an engine in deceleration fuel shut off (DFSO), determining a rate of change of a range to a target vehicle, and commanding an exit from the DFSO based on the range rate of change. A first example of the method further includes wherein commanding the exit from the DFSO based on the range rate of change includes predicting an adjustment of one or more of an engine load and an engine speed in response to the range rate of change, and commanding the exit from the DFSO prior to the predicted adjustment of the one or more of the engine load and the engine speed. A second example of the method, optionally including the first example of the method, further includes wherein the range rate of change is positive, and the predicted adjustment is an increase in the one or more of the engine load and the engine speed. A third example of the method, optionally including one or more of the first and second examples of the method, further includes wherein the range rate of change is negative, and the predicted adjustment is a decrease in the one or more of the engine load and the engine speed.

An example of a method for an engine in a vehicle comprises operating the engine in deceleration fuel shut off (DFSO), detecting a target location external to the vehicle, and advancing an exit from the DFSO based on the detected target location. A first example of the method further includes wherein detecting the target location includes receiving an indication of the target location being within a distance threshold of the vehicle from one or more networks, lidar sensors, radar sensors, sonar sensors, acoustic sensors, and onboard cameras, and identifying the target location based on the received indication. A second example of the method, optionally including the first example of the method, further includes wherein the detected target location corresponds to an additional vehicle located ahead of the vehicle. A third example of the method, optionally including one or more of the first and second examples of the method, further includes wherein advancing the exit from the DFSO includes determining a rate of change of a range to the additional vehicle, predicting receipt of one of a torque request and a braking request based on the range rate of change, and advancing the exit from the DFSO prior to the predicted receipt of the one of the torque request and the braking request. A fourth example of the method, optionally including one or more of the first through third examples of the method, further includes wherein the range rate of change is positive for a threshold duration, and the predicted receipt includes the torque request being received at a time after the threshold duration. A fifth example of the method, optionally including one or more of the first through fourth examples of the method, further includes wherein the range rate of change is negative for a threshold duration, and the predicted receipt includes the braking request being received at a time after the threshold duration. A sixth example of the method, optionally including one or more of the first through fifth examples of the method, further comprises determining whether one or more highway conditions are met, the one or more highway conditions including an increase in a vehicle speed, an increase in an ambient temperature, and an increase in a wind resistance, and wherein advancing the exit from the DFSO based on the detected target location is in response to the one or more highway conditions being met. A seventh example of the method, optionally including one or more of the first through sixth examples of the method, further includes wherein the detected target location corresponds to an altered speed zone located ahead of the vehicle. An eighth example of the method, optionally including one or more of the first through seventh examples of the method, further includes wherein advancing the exit from the DFSO based on the detected target location includes predicting an acceleration event of the vehicle based on the altered speed zone, and advancing the exit from the DFSO prior to the predicted acceleration event. A ninth example of the method, optionally including one or more of the first through eighth examples of the method, further includes wherein the altered speed zone has a higher speed limit than a current speed zone, and the predicted acceleration event includes the vehicle accelerating upon reaching the altered speed zone. A tenth example of the method, optionally including one or more of the first through ninth examples of the method, further includes wherein the altered speed zone has a lower speed limit than the current speed zone, and the predicted acceleration event includes the vehicle accelerating after both of reaching the altered speed zone and decelerating in response to the altered speed zone.

An example of a system for a vehicle comprises an engine configured to operate in deceleration fuel shut off (DFSO), one or more forward-facing sensors configured to receive signals indicative of a target vehicle located ahead of the vehicle, and a controller storing instructions in non-transitory memory, the instructions executable by a controller to receive the signals from the one or more forward-facing sensors, detect the target vehicle by processing the received signals, determine a rate of change of a distance to the target vehicle, and responsive to each of a magnitude of the rate of change being higher than a threshold and the DFSO being initiated, exit the DFSO early. A first example of the system further includes wherein the one or more forward-facing sensors include one or more lidar sensors, radar sensors, sonar sensors, acoustic sensors, and onboard cameras. A second example of the system, optionally including the first example of the system, further includes wherein determining the rate of change includes estimating the distance to the target vehicle over a duration, and determining the rate of change as a function of the distance and the duration. A third example of the system, optionally including one or more of the first and second examples of the system, further includes wherein the instructions are executable to, responsive to each of the magnitude of the rate of change and the DFSO not yet being initiated, prevent the engine from operating in the DFSO. A fourth example of the system, optionally including one or more of the first through third examples of the system, exiting the DFSO early includes exiting the DFSO before one or more DFSO exit conditions have been met, the one or more DFSO exit conditions including an engine speed exceeding an engine speed threshold and an engine load exceeding an engine load threshold.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
   while operating an engine in deceleration fuel shut off (DFSO):
      determining a rate of change of a range to a target vehicle; and
      commanding an exit from the DFSO based on the range rate of change, wherein commanding the exit from the DFSO based on the range rate of change includes:
         predicting an adjustment of one or more of an engine load and an engine speed in response to the range rate of change; and
         commanding the exit from the DFSO prior to the predicted adjustment of the one or more of the engine load and the engine speed.

2. The method of claim 1, wherein
   the range rate of change is positive; and
   the predicted adjustment is an increase in the one or more of the engine load and the engine speed.

3. The method of claim 1, wherein
   the range rate of change is negative; and
   the predicted adjustment is a decrease in the one or more of the engine load and the engine speed.

4. A method for an engine in a vehicle, the method comprising:
   operating the engine in deceleration fuel shut off (DFSO);
   detecting a target location external to the vehicle;
   determining whether one or more highway conditions are met, the one or more highway conditions including an increase in a vehicle speed, an increase in an ambient temperature, and an increase in a wind resistance; and
   advancing an exit from the DFSO based on the detected target location and in response to the one or more highway conditions being met.

5. The method of claim 4, wherein detecting the target location includes:
   receiving an indication of the target location being within a distance threshold of the vehicle from one or more networks, lidar sensors, radar sensors, sonar sensors, acoustic sensors, and onboard cameras; and
   identifying the target location based on the received indication.

6. The method of claim 4, wherein the detected target location corresponds to an additional vehicle located ahead of the vehicle.

7. The method of claim 6, wherein advancing the exit from the DFSO includes:
   determining a rate of change of a range to the additional vehicle;
   predicting receipt of one of a torque request and a braking request based on the range rate of change; and
   advancing the exit from the DFSO prior to the predicted receipt of the one of the torque request and the braking request.

8. The method of claim 7, wherein
   the range rate of change is positive for a threshold duration; and
   the predicted receipt includes the torque request being received at a time after the threshold duration.

9. The method of claim 7, wherein
   the range rate of change is negative for a threshold duration; and
   the predicted receipt includes the braking request being received at a time after the threshold duration.

10. The method of claim 4, wherein the detected target location corresponds to an altered speed zone located ahead of the vehicle.

11. The method of claim 10, wherein advancing the exit from the DFSO based on the target location includes:
    predicting an acceleration event of the vehicle based on the altered speed zone; and
    advancing the exit from the DFSO prior to the predicted acceleration event.

12. The method of claim 11, wherein
    the altered speed zone has a higher speed limit than a current speed zone; and
    the predicted acceleration event includes the vehicle accelerating upon reaching the altered speed zone.

13. The method of claim 12, wherein
    the altered speed zone has a lower speed limit than the current speed zone; and
    the predicted acceleration event includes the vehicle accelerating after both of reaching the altered speed zone and decelerating in response to the altered speed zone.

14. A system for a vehicle, comprising:
    an engine configured to operate in deceleration fuel shut off (DFSO);
    one or more forward-facing sensors configured to receive signals indicative of a target vehicle located ahead of the vehicle; and
    a controller storing instructions in non-transitory memory, the instructions executable by a processor to:
       receive the signals from the one or more forward-facing sensors;
       detect the target vehicle by processing the received signals;
       determine a rate of change of a distance to the target vehicle, including estimating the distance to the target vehicle over a duration and determining the rate of change as a function of the distance and the duration; and
       responsive to each of a magnitude of the rate of change being higher than a threshold and the DFSO being initiated, exit the DFSO early.

15. The system of claim 14, wherein the one or more forward-facing sensors include one or more lidar sensors, radar sensors, sonar sensors, acoustic sensors, and onboard cameras.

16. The system of claim 14, wherein the instructions are executable to:
    responsive to each of the magnitude of the rate of change and the DFSO not yet being initiated, prevent the engine from operating in the DFSO.

17. The system of claim 14, wherein exiting the DFSO early includes:
    exiting the DFSO before one or more DFSO exit conditions have been met, the one or more DFSO exit conditions including an engine speed exceeding an engine speed threshold and an engine load exceeding an engine load threshold.

* * * * *